Sept. 15, 1970        R. R. JOHNSON ET AL        3,528,295
STYLUS WITH PRESSURE RESPONSIVE TRANSDUCER
Filed June 25, 1968        2 Sheets-Sheet 1
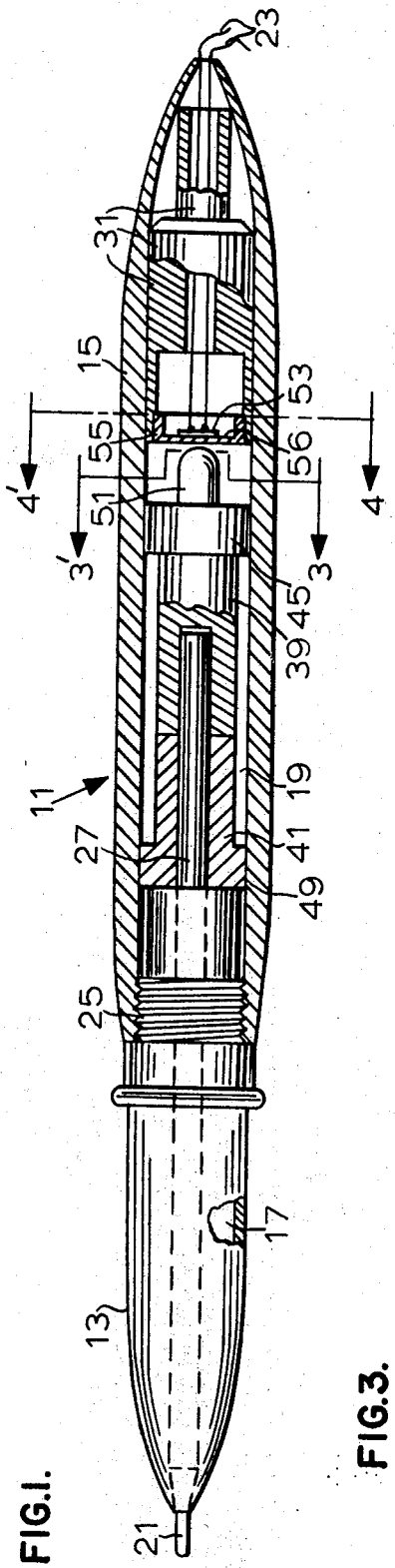
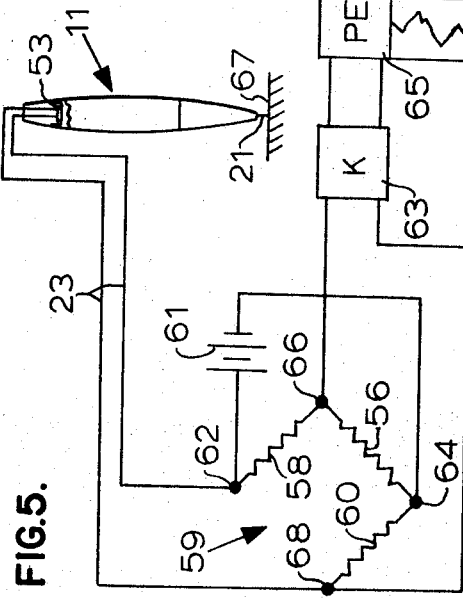
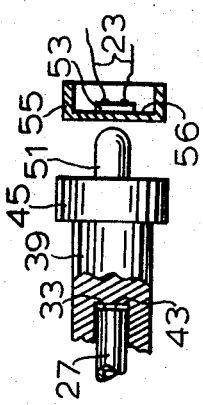
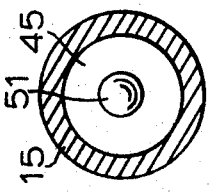
INVENTORS.
ROBERT R. JOHNSON.
EDWIN O. ROGGENSTEIN.
NALLICHERI T. VISWANATHAN.
BY
ATTORNEY.

United States Patent Office 3,528,295
Patented Sept. 15, 1970

3,528,295
STYLUS WITH PRESSURE RESPONSIVE TRANSDUCER
Robert R. Johnson, Franklin, Edwin O. Roggenstein, Birmingham, and Nallicheri T. Viswanathan, Plymouth, Mich., assignors to Burroughs Corporation, Detroit, Mich., a corporation of Michigan
Filed June 25, 1968, Ser. No. 739,817
Int. Cl. G01l 5/00
U.S. Cl. 73—432    10 Claims

ABSTRACT OF THE DISCLOSURE

A writing instrument useful in automatically utilizing and/or characterizing unique, repeatable characteristics of handwriting in terms of an analogue waveform. In accordance with the preferred embodiment of applicants' disclosure, a force-responsive transducer is fixedly mounted within the housing of a writing instrument, such as a ball point pen. During use of the writing instrument the forces exerted on the writing surface by the pen or stylus marking tip simultaneously actuates the transducer thereby generating electrical signals which are proportional to the varying degree or magnitude of the force exerted on the writing surface by the marking tip. These electrical signals or waveforms may be coupled to an amplifier and recorder thereby recording the analogue pressure waveform which is characteristic of the pressure or forces generated during the writing operation.

CROSS REFERENCE

This invention relates to and is useful in a writing classification or identification system of the type disclosed and claimed in co-pending application Ser. No. 739,803, filed June 25, 1968, in the name of R. R. Johnson et al. which is assigned to the assignee of the present invention.

BACKGROUND

As is known in the art it is often desirable to convert cursive writing and the like into electrical signal patterns for purposes of analyzing the characteristics of the written matter or for forming electrical signals suitable for transmission, for example, in telewriting systems.

In the telewriting art a variety of electrical transducers have been developed for converting cursive writing and the like to electrical signals. This apparatus generally takes the form of an unrestricted conductive stylus which when selectively positioned on an electrically conductive surface establishes a conductive path between selected output points on the electrically resistive writing surface. In this manner the output from the specially treated or formed writing surface comprises a pattern of electrical signals representative of the characters or message written. Generally this conductive grid method of generating an electrical waveform corresponding to characteristics of cursive writing and the like while somewhat useful is restricted in use primarily because of the high cost arising from the specially treated and fabricated writing surfaces. Further, the extreme nonlinearity of the electric fields developed in such resistive-type writing surfaces, particularly near its edge, reduces the useful writing area to a small fraction of the total writing surface.

One prior art system and device of which applicants are aware for analyzing and classifying cursive writing and the like involves the pneumatic integration of the forces or pressure exerted between a stylus and a pressure-responsive writing surface. One such device employs a gimbaled writing table cooperable with pressure-actuatable valves for charging or discharging a pressure chamber in accordance with the forces exerted during the use of a special writing stylus. Pneumatic integrating type systems such as these have not found widespread use primarily because they are bulky and very limited in the locations wherein such writing surfaces may be suitably operated.

It is therefore an object of the present invention to provide an improved stylus for converting cursive writing and the like into unique electrical signal patterns suitable for classifying and analyzing handwriting and the like.

It is a further object of the present invention to provide a writing instrument capable of recording repeatable characteristics involved in an individual's signature to provide a basis for accurate automated comparison or classification of additional signatures of the same individual.

It is yet another object of the present invention to economically convert cursive writing and the like into electrical signals.

It is a still further object of the present invention to generate electrical signals proportional to the varying forces generated between the stylus and writing surface during the course of writing a signature and the like.

The above objects and other discerniable aspects are achieved in accordance with the preferred embodiments of applicants' invention by incorporating a force-responsive transducer in a writing instrument in cooperable juxtaposition with a movably mounted support member which carries the marking tip. As the writing instrument is moved in contact with the writing surface in the course of writing cursive script, for example a signature, the varying forces exerted by the writing tip on the writing surface simultaneously exerts a proportional varying force or pressure on the force-responsive transducer thereby generating electrical signals proportional in amplitude and duration to the applied forces between the stylus and the writing surface. The electrical signals may be coupled from the transducer to an appropriate electrical circuit, for example, an amplifier and recorder, thereby generating a varying amplitude electrical analogue signal, the instantaneous amplitude of which is proportional to the varying forces exerted on the writing surface by the tip of the writing instrument.

For a more complete understanding of applicants' invention recourse may be had to the following detailed description in conjunction with the drawings wherein:

FIG. 1 is a detailed longitudinal section of a writing instrument embodying the principles of the present invention;

FIGS. 2A and 2B illustrate the unactuated and actuated positions of the plunger and transducer shown in FIG. 1;

FIG. 3 is a sectional view taken along the line 3—3' of FIG. 1;

FIG. 4 is a sectional view taken on line 4—4' of FIG. 1;

FIG. 5 is a schematic representation of an electrical circuit utilizable for recording electrical waveforms generated in accordance with the principles of the present invention;

Figure 6:
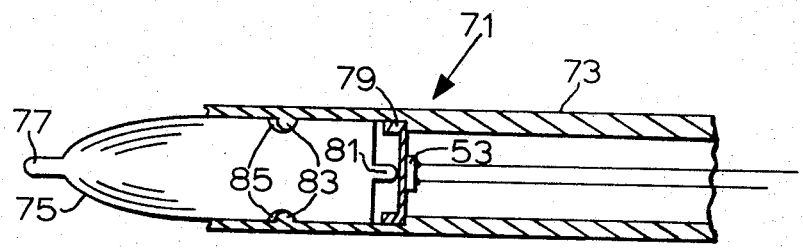
FIG. 6 illustrates a longitudinal section of another embodiment of applicants' stylus.

Referring now to FIG. 1 there is shown a detailed sectional view of the stylus or pen 11. As shown therein, the stylus 11 comprises a two-piece essentially barrel-shaped housing including a tip-end section 13 and a rear housing section 15. Housing sections 13 and 15 are preferably provided with a recess 17 and 19 respectively for slideably supporting a marking tip support member 27 within the housing. The forward or tip-end housing section 13 is appropriately apertured to permit the passage of the marking tip 21 beyond the housing 11. Housing section 15 is likewise suitably apertured to permit the passage of conductors 23 from the interior of the housing 11. The front end housing section 13 is preferably removably mounted on the rear section 15, for example, by threaded portions 25.

While applicants' invention may be adapted for any type of writing instrument, it will be explained in conjunction with a ball point pen of well known construction. Referring again to FIG. 1, a conventional ball point pen cartridge 27 is shown mounted within the housing. The writing tip 21 carried by the cartridge 27 is shown extending beyond the housing 11 in the normal manner. A suitable spring (not shown) may be employed to resiliently bias the pen tip 21 forwardly, i.e., outwardly from the housing 11. The cartridge 27, which as is known in the art serves as a support member for the writing tip 21 and as a reservoir for marking material for the ball point pen, is geneally mounted for axial movement within the housing in sections 13 and 15.

In accordance with the preferred embodiment of applicants' invention a transducer housing 31 is fixedly mounted within the rear housing section 15 with transducer cell cartridge 55 in cooperable juxtaposition with end 33 (FIG. 2A) of cartridge 27. By way of example, the force-responsive transducer may comprise a strain gauge carried by cartridge 31. The cartridge 31 may be inserted into the open end of housing section 15 when it is removed from the forward end housing section 13. The transducer housing 31 may comprise, as hereinafter to be more fully explained in conjunction with FIG. 4, a recessed, plug type plastic member with the outside side walls thereof conforming to and frictionally engaging the inward wall of the housing section 15. The transducer housing 31 may be arranged in and held at the desired position within housing 15 by any known means, for example, frictionally engaging a portion of the inner wall of housing 15 or appropriately positioned stops.

As hereinabove stated, the ball point pen cartridge 27 is axially movable within the housing sections 13 and 15. As hereinabove explained, a spring (not shown), may be arranged to bias the cartridge 27 forwardly and to permit movement of cartridge 27 inwardly during a writing operation of the pen when the point 21 is in contact with, i.e., exerting a force on, the writing surface. FIGS. 2A and 2B illustrate the travel of cartridge 27 to actuate transducer cell cartridge 55. As shown in FIG. 2A, cartridge 27 is normally biased or held away from transducer cell 55. As shown in FIG. 2B, inward travel of cartridge 27 in response to a force exerted on the writing surface by the writing tip 21 positions the guide member tip 51 in pressure contact with transducer cell 55.

Proximate the mid point and end 33 of cartridge 27 there is positioned a pair of guide members 39 and 41. Guide members 39 and 41, which could be of unitary construction, are designed to limit the sideward movement of cartridge 27 within the housing to predetermined limits. Specifically, in the embodiment illustrated, guide members 39 and 41 restrict the movement of cartridge 27 during its inward travel substantially parallel to the major axis of housing 11. Guide member 39 comprises a cylindrical sleeve-like member having a recess 43 for receiving end 33 of cartridge 27. Shoulder or collar portion 45 of guide 39 is preferably arranged to slide over, i.e., frictionally engage, the inner surface of housing 15 and confine the movement of cartridge 27 during its inward travel. Likewise, guide member 41, which has an axial bore formed therein for receiving a portion of the length of cartridge 27, has a shoulder portion 49 for engaging a portion of the interior surface of housing 15. In the preferred embodiment the respective guide members 39 and 41 are molded or machined from a low coefficient-of-friction plastic material such as Delrin sold by the du Pont Company.

To obtain uniform and repeatable results with the stylus, it is desirable that the transducer cell cartridge 55 be accurately positioned relative to the end portion 33 of cartridge 27. By employing the cylinder guide members 39 and 41 to constrain the inward movement of cylinder 27 within predetermined limits, the transducer housing 31 and cell cartridge 55 may be fixedly mounted for proper actuation by cartridge 27. In the illustrative embodiment of applicants' stylus the guide members 39 and 41 restrain the inward movement of cartridge 27 to a direction substantially parallel to the major axis of cartridge 11. By appropriately dimensioning similar guides it is possible to position a plurality of transducer cell cartridges within the housing 11 to simultaneously respond to respective movements of cartridge 27 within a plurality of defined degrees of freedom. For example, the bending or torque on cartridge 27 could be simultaneously measured along with its axial movement or displacement force.

Referring now to FIG. 3 there is shown a sectional view taken along the line 3-3' of FIG. 1. As shown, the collar or shoulder portion 45 of guide members 39, and like-wise 49 on guide 41, is substantially cylindrical in cross section. As here inabove described, it is desirable to have the collar 45 shaped to conform with the shape of the interwall of housing 15. By forming the guide shoulder 45 of a material having a low coefficient of friction, the guide shoulder 45 is self-lubricating when in sliding contact with the wall. With reference to FIGS. 1, 2 and 3 it may be seen that the rearward portion of guide 39 comprises a transducer actuating projection 51. The exact shape of the wall-engaging shoulders 45 and 49 would be determined by the shape of the inner wall housing 15 with which they are to conform. In this case of a substantially cylindrical bore through the housing 15, the guide members may comprise cylindrical members with the nonshoulder portions thereof being appropriately turned down. By employing such a manufacturing process it is possible to form the entire guide member from a single piece of material with the transduced actuating projection 51 shaped to provide essentially a point contact on the diaphragm of transducer cell 55.

Referring now to FIG. 4 there is shown a sectional view of the forward end of the transducer cartridge 55 taken along the line 4-4' of FIG. 1. As hereinabove described, the force or pressure-responsive transducer in the preferred embodiment of applicants' invention comprises a strain gauge 53. The strain gauge 53 is cooperably positioned with end 33 of cartridge 27 such that the inward travel of cartridge 27 exerts a force via tip 51 on the diaphragm of cell 55 proximate strain gauge 53 thereby, in a manner well known in the art, changing the electrical characteristics of the strain gauge 53. The resulting variation in electrical characteristics of the strain gauge in response to a force or pressure applied during inward movement of cartridge 27 may be employed, in a manner hereinafter to be more fully described, to generate electrical waveforms proportional to the varying forces applied by end 33 of the cartridge 27 to transducer call 55.

As shown in FIGS. 3 and 4, the transducer cell 55 comprises a metallic, cup-shaped member having a thin-walled diaphragm portion 56. The upstanding side wall portion of the disk-shaped member 55 is shaped to conform to the inside diameter of an axial bore or recess of transducer housing 31. The strain gauge element 53, which for example may comprise Type EA-13-050AH-120 manufactured and marketed by Micro Measurements Inc., is fixedly attached to the diaphragm portion 56 by any known means, for example, an epoxy glue compound. The strain gauge 53 is mounted on the inside wall of the thin-walled diaphragm 56 which is opposite that to be actuated by the projection 51 of guide member 39 as shown in FIG. 1. In this manner the strain gauge is arranged to be actuated during the inward microscopic movement of cartridge 27 thus resulting in the generation of appropriate waveforms proportional to the varying instantaneous forces exerted by marking point 21 on a writing surface.

Referring now to FIG. 5 there is shown an illustrative block diagram of an electrical circuit utilizable in accordance with the principles of the present invention. As is shown schematically, the transducer element, i.e., strain gauge 53, is connected as one leg of resistive bridge circuit 59 which includes strain gauge 53 and resistors 56, 58 and 60. A source of electrical potential, for example, a battery 61, is connected to diagonally opposite terminal points 62 and 64 on the bridge 59. The output from the bridge 59 is coupled from the other pair of diagonally opposite terminals 66 and 68 of the bridge to the input of an amplifier 63. The output from the amplifier 63 is coupled to the input of a utilization device, for example, an oscillograph or electronic recorder 65.

In operation, when point 21 of pen 11 contacts a writing surface 67, the cartridge or support member fixedly attached to marking point 21 moves axially rearward or inward into cartridge 11. As is hereinabove described in conjunction with FIG. 1, the force or pressure-responsive transducer 53 is positioned within housing 11 for actuation by the inward movement of the members supporting marking point 21. In response to the force directly transmitted to the force or pressure-responsive transducer, i.e., the strain gauge 53, the bridge 59 is unbalanced and an output signal proportional to the unbalanced condition is coupled to the input of the amplifier 63. The amplified signal out of amplifier 63 is coupled to the input of recorder 65 to actuate a stylus or other suitable marking element to generate or trace a mark corresponding to the instantaneous amplitude of the electrical signals applied thereto. As the force or pressure transmitted from the tip 21 to the pressure-responsive transducer 53 varies, the electrical unbalanced condition in the bridge correspondingly varies thereby generating an analogue signal, the amplitude of which is proportional to the instantaneous time-varying values of force between the marking tip 21 of stylus 11 in marking on surface 67.

Figure 7:
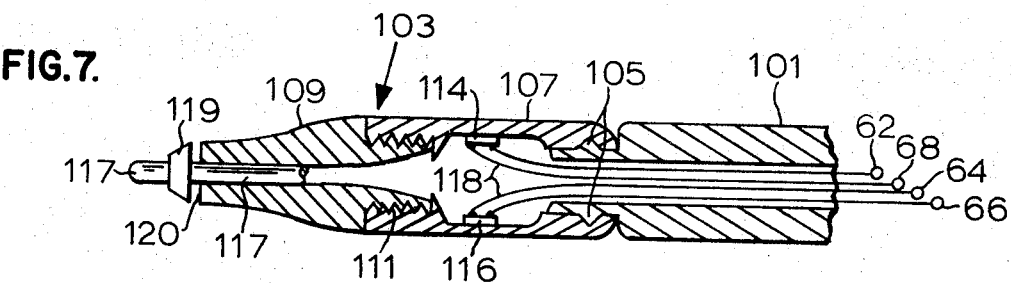
FIG. 7 illustrates a longitudinal section of a further embodiment of applicants' stylus.

Referring now to FIGS. 6 and 7 there are shown two other embodiments of applicants' direct co-impression-reading stylus. As hereinabove explained in conjunction with FIGS. 1 and 2, the inward movement of the member 27 directly actuates the transducer cell 55. In certain applications it is desirable to have a stylus which does not utilize either a marking tip and/or an internally movable member. Once such application of a non-marking stylus involves the reading of embossed or other specially prepared coded information from, for example, a credit card or retail tag into a data processing system.

The pen or stylus 71 shown in FIG. 6 includes a tubular shaped housing portion 73 which is dimensioned to be grasped by the user, and a record contacting plug portion 75 which includes a projection or tip 77. The main or upper end housing 73 is preferably recessed to insertably receive a portion of plug 75 therein. For example the transducer cell 79, which is of similar construction to that shown and described hereinabove in conjunction with FIGS. 1 and 2, may be fixedly positioned and held within the upper housing with the strain gauge 53 permanently mounted on the side of the cell diaphragm opposite that arranged to be actuated by projection 81 of plug 75.

As shown in the drawings, the forward end of housing 73 includes detents or stops 83, which may comprise raised bumps or a suitably dimensioned ring. The outer surface of plug 75 has formed therein complementary recess or latches 85. The forward end of housing 73 may for example be sufficiently resilient to permit the manual insertion of plug 75 into the forward end of housing 73. With plug 75 inserted into and held by housing 73, the detents 83 cooperate with the latches or recesses 85 to moveably retain the plug 75 in the forward end of housing 73. As shown the recesses or latches 85 are so shaped and dimensioned, i.e. enlarged radius towards the tip 77, to cooperate with projections 83 to permit limited inward movement of plug 75 when tip 77 contacts a record surface. The limited inward movement of plug 75 cooperably positions tip 81 in pressure transmitting relationship with the diaphragm of transducer cell 79. As hereinabove described, in response to the varying force or pressure transmitted to the diaphragm of transducer cell 79 as the tip 77 contacts a surface the transducer 73 generates a varying resistance value in response to pressure deformation. This varying electrical resistance as hereinabove described in conjunction with FIG. 5 may be employed for example in a bridge circuit, to generate an analogue signal proportional to the force or pressure exerted by tip 77 on a record surface.

As illustrated in FIG. 7 the pressure or force responsive transducer need not be responsive to a direct, compressive force within the stylus housing but the transducer instead may be responsive to compressive forces transmitted to and through the housing member. The embodiment of applicants' stylus illustrated in FIG. 7 comprises a main stylus housing 101 which removeably carries a strain gauge cartridge member 103 at one end thereof. As illustrated the strain gauge cartridge member may be removeably mounted on one end of the main housing by means of resilient snap-action coupling 105. The strain gauge cartridge 103 comprises a recessed or hollow member 107 and a tip section 109. Tip section 109 is preferably removably mounted thereon by for example cooperable threaded portions 111. The respective portions of the housing may be fabricated from any material, for example a rigid plastic.

The pressure responsive elements 114 and 116 may for example comprise a pair of the hereinabove identified strain gauges. The pressure responsive elements are preferably fixedly mounted on the inner wall of recessed member 107 by any known means for example an epoxy bonding glue. In operation as tip 117 contacts an embossed record or writing surface, shoulder 119 which may comprise a ring or appropriate shoulder type projection, is urged and moved into forced transmitting relationship with the forward tip 120 of frame member 109. The force or pressure thus transmitted to the frame member 109 and through the rigid bumper coupling to member 107 exerts a minute or microscopic deformation force or pressure on strain gauge elements 114 and 116 fixedly attached to and carried on the inner wall of member 103. The four electrical leads 119 are adapted to connect the respective terminals of the two strain gauges 114 and 116 to an external bridge circuit. With reference to FIG. 5 the two respective strain gauge elements 114 and 116 may be connected in a bridge circuit by coupling the respective terminals 62, 64, 66 and 68 of leads 119 to the similarly numbered junctions of bridge 59 and eliminating resistor 56.

Figure 8:
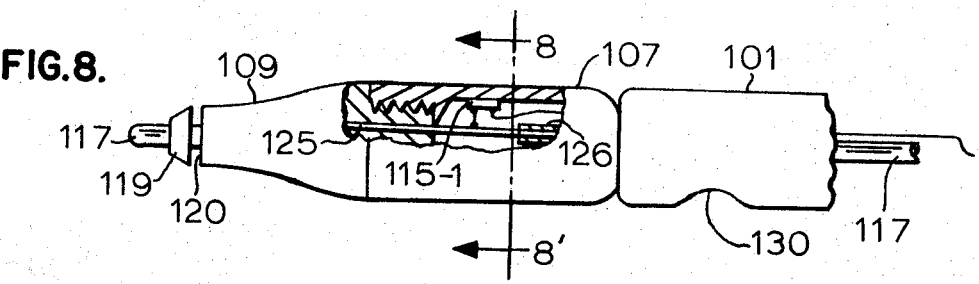
FIG. 8 is a partially broken away view of yet another embodiment of applicants' stylus.
Figure 9:
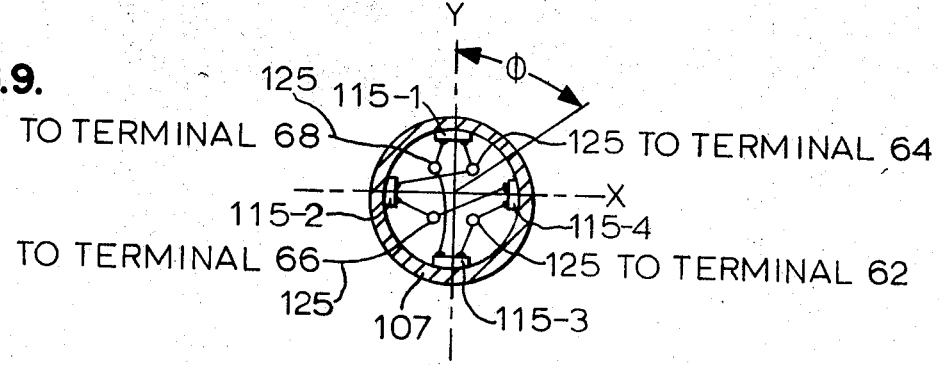
FIG. 9 is a sectional view taken along the line 8—8' of FIG. 8.

Referring now to FIGS. 8 and 9 there is illustrated yet another stylus embodying the principles of applicants' invention. The stylus illustrated in FIG. 8 may be similar to the composite housing or frame construction illustrated in FIG. 7, however, as will hereinafter be more fully explained in conjunction with FIG. 9, the stylus is designed to be responsive to bending rather than direct compression forces. As hereinabove explained in conjunction with FIG. 7, a record contacting tip 117 is slideably retained, by any known detent or lock means not shown within the strain gauge cartridge 103. Strain gauge cartridge member 103 is adapted to be removably attached to one end of a main stylus housing 101. In operation as hereinabove explained, when the tip 117 contacts a record surface, shoulder 119 is urged and moves into a force transmitting relationship with surface 120 of housing portion 109 of the transducer cell member 103. This varying force or pressure with which tip 117 contacts a surface is transmitted to and through the body of the stylus and exerts a varying minute or microscopic deformation force on the strain gauge 115 mounted on the interior wall of member 109.

As shown in FIG. 9 there are preferably a plurality of pressure transducers 115–1 through 115–4 spaced apart and fixedly mounted to the interior wall of cartridge member 109. By way of example, for the cylindrical frame member illustrated, each of the four transducers 115–1 through 115–4 are preferably displaced ninety degrees from adjacent ones of the transducers. As is known to those skilled in the art, the electrical leads for each transducer 115 could be brought out through the housing to be coupled to an external electrical circuit by any known means. For example the leads of the respective transducers may be passed through appropriate openings in the housing member 101 to directly couple the leads to an external circuit. For ease of assembly and interconnection of the respective leads of the four transducers 115 in a bridge-type circuit, prongs 125 are adapted to function as electrical terminals within the housing of member 109 and as a part of an electrical connector. The prongs 125 are positioned and dimensioned to cooperate with four plug type female connectors 126. As illustrated the leads of each transducer 115–1 through 115–4 are connected to a designated one of the prongs 125. With the prongs 125 in electrical contact with the plug connectors 126, when the stylus is assembled, the four leads may be passed from the female connector through hte housing 107 via appropriate passages or apertures. The four leads brought thru the housing may be connected as a bridge circuit with the source of electrical potential connected across terminal 62 and 64 and the output taken across terminal 66 and 68, as illustrated in FIG. 5.

In operation depending upon the rotational orientation of the stylus the user's hand relative to the fixed position of the transducers 115–1 through 115–4 as illustrated by lines X and Y, a force due to the bending moment exerted on the tip section during movement of the stylus in pressure contact with a record member, is either exerted on a pair of transducers with the other pair being substantially unaffected or an all four transducers complementary pairs. In general the output signal A of the four transducers may be expressed as: $A = \sin \phi + \cos \phi$, where $\phi$ is the rotational angle of the stylus in the user's hand relative to the position of the transducers. In the first case when a pair of transducers are involved, one transducer, i.e. the upper one relative to the housing as it is held in the user's hand, would be in compression while its associated transducer, i.e. the one displaced one hundred and eighty degrees, therefrom, would be in compression. In the second case where the pen and stylus is oriented such that the angle $\phi$, as shown in FIG. 9 is intermediate the respective transducer pairs, each of the diagonally opposite transducer groups constitute a compression-tension companion pair. In either case a bending force proportional to the force between the stylus and the marking surface induces a corresponding resistance variation in the strain gauge elements. As hereinabove described in connection with FIG. 5, the variations in the resistance of the legs of the bridge generates a corresponding varying amplitude analogue signal across the output terminals 66 and 68. With reference to FIG. 5 it may be seen that the respective pairs, i.e. the four, transducers 115–1 through 115–4, illustrative in FIG. 9 may be connected in and utilized as a bridge circuit with the prong terminals 125 being coupled in a bridge-like arrangement with four output leads from prongs 125 being the respective terminals 62, 64 and 68 of the bridge circuit as illustrated in FIG. 5. In this arrangement resistors 56, 58 and 60 of the bridge circuit in FIG. 5 are replaced by the additional three strain gauge elements, terminals 62 and 64 would be used to couple a source of potential to the bridge, and the output would be taken from the terminals 66 and 68.

Since the amplitude of the output signal from the transducers illustrated in FIG. 9 is sensitive to and dependent upon the relative rotational position of the stylus, it is desirable to provide the stylus with a preferred position indicator. This is particularly true for the four transducer embodiment as the mathematical function:

$$A = \sin \phi + \cos \phi$$

is zero for certain values of $\phi$. The preferred stylus alignment indicator may comprise a thumb and/or finger position guide formed in the housing 101, or a specially shaped stylus housing which is, for example, elliptical or oval in cross section to aid the user in properly orienting the stylus in the preferred position. As shown in FIG. 8, the preferred stylus position indicator comprises a thumb-shaped depression 130 in housing 101 proximate the writing end.

While in the foregoing descriptions and drawings a particular embodiment of applicants' force or pressure-responsive stylus has been disclosed and described, it is to be understood that many modifications may be made in structure and operation without departing from the spirit of applicants' invention. For example, the number and location of the force-responsive transducers within the pen housing assembly and the shape and positioning of the various guide members may be considerably varied by those skilled in that art without departing from applicants' invention which is described with particularity in the appended claims.

What is claimed is:

1. A stylus for generating electrical signals proportional to forces exerted on a surface during movement of said stylus in contact with said surface, said stylus comprising,
    an exterior barrel-shaped housing adapted to be grasped by a user,
    tip means carried by and extending beyond one end of said housing for contacting said surface, said tip means yieldable to transmit the forces to said housing, and
    a strain gauge for generating electrical signals proportional to the varying magnitude of said forces exerted when said tip means contacts said surface and mounted on and within said housing.

2. A stylus for generating electrical signals proportional to the instantaneous value of force exerted by said instrument while in contact with a sheet, said instrument comprising,
    a tubular shaped housing adapted to be grasped by a writer,
    cartridge means slideably supported within and extending beyond one end of said housing,
    tip means extending beyond said cartridge means for contacting said record sheet, and
    a strain gauge within said housing for generating electrical signals under strain applied thereto by movements of said cartridge means.

3. A writing instrument for generating an electrical signal waveform proportional to the instantaneous value of force exerted by said instrument while in contact with a sheet, said instrument comprising,
    a tubular shaped external housing adapted to be grasped by a writer,
    cartridge means slidably supported within and extending beyond one end of said housing,
    tip means extending beyond said cartridge means for contacting said sheet,
    transducer means within said housing for generating electrical signals in response to movements of said cartridge means,
    means for coupling said transducer means to an electric circuit,
    support means slidably positioned within said housing for carrying said tip means,
    guide means within said housing for restraining movement of said support means within a predetermined number of degrees of freedom,
    said guide means including,
    at least one cylindrically shaped member, said cylindrically shaped member including a recessed portion for insertedly receiving a portion of said support means therein, shoulder means carried by a portion of said cylindrically shaped member for slidably engaging a portion of said housing, and shaped projection means carried by said cylindrically shaped member for contacting said transducer means.

4. The writing instrument defined in claim 3 additionally including, a second cylindrically shaped member having an axial bore throughout its length for slidably receiving said cartridge means, and shoulder means integrally formed on a portion of said second cylindrically shaped member for slideably engaging a portion of said housing proximate said tip, said shoulder means limiting said movement of said support means to a direction substantially parallel to the major axis of said tubular housing.

5. The writing instrument defined in claim 4 wherein said one and said second cyclindrically shaped members are formed from a low coefficient of friction plastic material.

6. A writing instrument for generating an electrical signal waveform proportional to the instantaneous value of force exerted by said instrument while in contact with a sheet, said instrument comprising, a tubular shaped external housing adapted to be grasped by a writer, cartridge means slidably supported within and extending beyond one end of said housing, tip means extending beyond said cartridge means for contacting said sheet, transducer means within said housing for generating electrical signals in response to movements of said cartridge means, and means for coupling said transducer means to an electrical circuit, said transducer means including at least one strain gauge element, and transducre cell means for fixedly supporting at least one of said strain gauge elements within said housing in cooperable juxtaposition with predetermined portions of said cartridge means.

7. The writing instrument defined in claim 6 wherein said transducer cell means comprises, a metallic cup-shaped member including a thin walled diaphragm portion, and wherein said strain gauge element is fixedly attached to and carried by said thin walled diaphragm portion on a side thereof opposite the end of said cartridge means remote from said marking tip.

8. A pressure responsive stylus comprising, a substantially barreled-shaped housing to be grasped by a user, tip means extending beyond said housing at one end thereof for contacting a record surface, at least one pressure or force responsive electrical transducer mounted within said housing, coupling means for coupling the force exerted upon a record surface by said tip means to said transducer, said coupling means including shoulder means for coupling the force to said housing and said transducer being fixedly bonded to the interior wall of said housing.

9. The stylus defined in claim 8 wherein a plurality of transducers are fixedly bonded to the interior wall of said housing and additionally including electrical plug means for coupling said plurality of transducers in a predetermined electrical circuit configuration.

10. A pressure responsive stylus comprising, a tubular housing, a slidably guided member within said housing having opposite ends, a writing tip on one end of said slidably guided member and projecting from said housing to bear against a record sheet, a diaphragm within said housing between the other end of said housing and said slidably guided member, said diaphragm affixed at its periphery to said housing and flexible by movement of said slidably guided member thereagainst, and a strain gauge mounted on said diaphragm responsive to the pressure exerted against said diaphragm to generate an electrical circuit commensurate with said pressure.

References Cited

UNITED STATES PATENTS

| 2,091,060 | 8/1937 | Watson | 33—18 |
| 3,029,526 | 4/1962 | Olalainty | 35—22 |
| 3,113,461 | 12/1963 | Peters | 73—432 |

JOSEPH W. HARTARY, Primary Examiner

U.S. Cl. X.R.

73—88.5; 178—18; 340—146.3; 346—33